US008830714B2

(12) United States Patent
Agarwal et al.

(10) Patent No.: US 8,830,714 B2
(45) Date of Patent: Sep. 9, 2014

(54) HIGH SPEED LARGE SCALE DICTIONARY MATCHING

(75) Inventors: Kanak B. Agarwal, Austin, TX (US); Harm P. Hofstee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 13/490,832

(22) Filed: Jun. 7, 2012

(65) Prior Publication Data

US 2013/0332146 A1 Dec. 12, 2013

(51) Int. Cl.
*G11C 15/00* (2006.01)
*G06F 17/30* (2006.01)

(52) U.S. Cl.
USPC .......................................... 365/49.17; 707/747

(58) Field of Classification Search
USPC ................. 707/747, 758; 711/100, 216, 108; 704/10; 365/189, 49
See application file for complete search history.

(56) References Cited

U.S. PATENT DOCUMENTS

| | | | |
|---|---|---|---|
| 4,503,514 A * | 3/1985 | Urquhart | 715/202 |
| 6,169,969 B1 * | 1/2001 | Cohen | 704/10 |
| 6,597,812 B1 | 7/2003 | Fallon et al. | |
| 6,700,809 B1 * | 3/2004 | Ng et al. | 365/49.1 |
| 6,876,559 B1 * | 4/2005 | Rathnavelu et al. | 365/49.1 |
| 6,934,796 B1 * | 8/2005 | Pereira et al. | 711/108 |
| 7,299,282 B2 | 11/2007 | Sarkissian et al. | |
| 7,356,663 B2 | 4/2008 | Jain | |
| 7,382,637 B1 * | 6/2008 | Rathnavelu et al. | 365/49.17 |
| 7,512,620 B2 | 3/2009 | Dingle | |
| 7,685,083 B2 | 3/2010 | Fairweather | |
| 2008/0140662 A1 | 6/2008 | Pandya | |
| 2010/0100673 A1 | 4/2010 | Cheriton | |

OTHER PUBLICATIONS

Scarpazza, Daniele P. et al., "Exact Multi-pattern String Matching on the Cell/B.E. Processor", Proceedings of the 5th Conference on Computing Frontiers (CF'08), Ischia, Italy, May 5-7, 2008, pp. 33-42.
Kim, Min-Soo et al., "n-Gram/2 L-approximation: a two-level n-gram inverted index structure for approximate string matching", presented at the International Journal of Computer Systems Science & Engineering, v 22, n 6, Nov. 2007, pp. 365-379.

* cited by examiner

*Primary Examiner* — Hung T Vy
(74) *Attorney, Agent, or Firm* — Stephen R. Tkacs; Stephen J. Walder, Jr.; Libby Z. Toub

(57) ABSTRACT

A mechanism is provided for dictionary matching. The mechanism loads a plurality of dictionary memory arrays with a set of dictionary words and updates a plurality of status arrays. Each status array of the plurality of status arrays corresponds to a respective one of the plurality of dictionary memory arrays. Each entry of a given status array stores a status bit, which indicates whether a corresponding entry of the corresponding dictionary memory array stores a valid dictionary word. The mechanism receives an input data word and generates a hash value based on the input data word. The mechanism reads a dictionary word from each of the dictionary memory arrays and a status bit from each of the status arrays using the hash value as a read address. The mechanism determines whether a dictionary memory array within the plurality of dictionary memory arrays stores a valid dictionary word that matches the input data word.

22 Claims, 7 Drawing Sheets

| RAM SIZE | EXPECTED # OF COLLISIONS |
|---|---|
| $L_M=L_D$ | $L_D/2$ |
| $L_M=2L_D$ | $L_D/4$ |
| $L_M=3L_D$ | $L_D/6$ |
| $L_M=4L_D$ | $L_D/8$ |
| $L_M=5L_D$ | $L_D/10$ |
| $L_M=6L_D$ | $L_D/12$ |
| $L_M=7L_D$ | $L_D/14$ |
| $L_M=8L_D$ | $L_D/16$ |
| $L_M=9L_D$ | $L_D/18$ |
| $L_M=10L_D$ | $L_D/20$ |

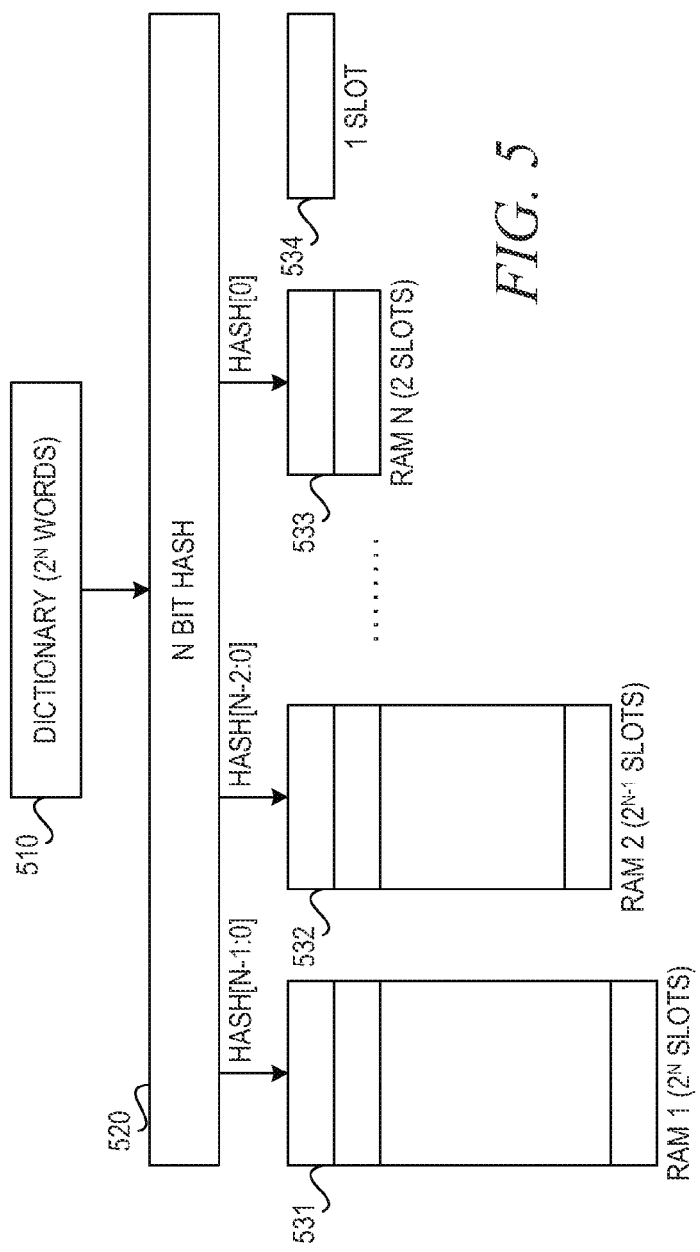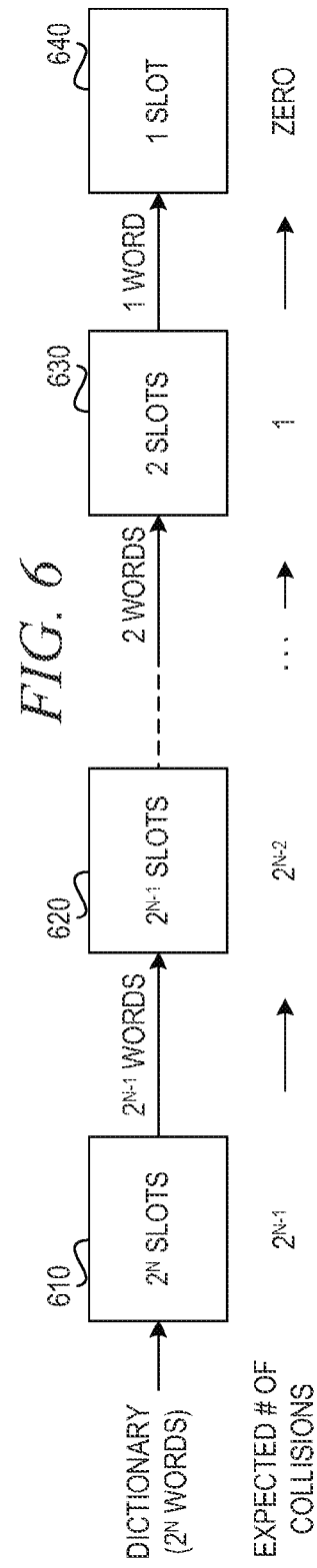

HIGH SPEED LARGE SCALE DICTIONARY MATCHING

BACKGROUND

The present application relates generally to an improved data processing apparatus and method and more specifically to mechanisms for high speed large scale dictionary matching.

Dictionary matching is a commonly used operation in a variety of applications. Dictionary matching is used in applications, such as text analytics, network intrusion detection systems, dictionary-based compression, virus scanners, spam filters, etc. Dictionary matching is challenging when considering large dictionary sizes and the requirement to perform wire-speed matching in real time on fast links (e.g., 10 Gbps Ethernet, 6 Gbps serial attached small computer systems interface, etc.)

Several approaches have been proposed for hardware acceleration of string matching. Prior art approaches usually employ deterministic finite automata (DFA) based algorithms. These implementations are either constrained by dictionary size or maximum achievable throughput. Some prior art approaches achieve higher bandwidth by using multiple input streams in parallel.

SUMMARY

In one illustrative embodiment, a method, in a data processing system, is provided for dictionary matching. The method comprises loading a plurality of dictionary memory arrays with a set of dictionary words and updating a plurality of status arrays. Each status array of the plurality of status arrays corresponds to a respective one of the plurality of dictionary memory arrays. Each entry of a given status array stores a status bit, which indicates whether a corresponding entry of the corresponding dictionary memory array stores a valid dictionary word. The method further comprises receiving an input data word and generating a hash value based on the input data word. The method further comprises reading a dictionary word from each of the dictionary memory arrays and a status bit from each of the status arrays using the hash value as a read address. The method further comprises determining whether a dictionary memory array within the plurality of dictionary memory arrays stores a valid dictionary word that matches the input data word.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 is a block diagram illustrating a modified hashing scheme for high speed large scale dictionary matching in accordance with an illustrative embodiment;

FIG. 6 illustrates managing hash collisions in the modified hashing scheme of the illustrative embodiment;

DETAILED DESCRIPTION

The illustrative embodiments provide a mechanism for enabling high bandwidth dictionary matching on very large dictionaries using a hashing based technique. For a dictionary of size $2^N$ words, the mechanism uses N memory arrays. The first memory array has the same size as the dictionary ($2^N$ slots) and is addressed by an N-bit hash [N−1:0]. The second memory array is half the size of the dictionary ($2^{N-1}$ slots) and is indexed by the N−1 bits of the hash [N−2:0], and so on down to a memory having two slots. Each memory array has a status array of the same size. Each slot of a status array stores a status bit.

When loading the dictionary, the mechanism creates an N-bit hash of each dictionary word (hash[N−1:0]). The mechanism attempts to store each word in the first free dictionary memory at its corresponding hash position. If a word causes a hash collision in a given dictionary memory, the mechanism attempts to store the word in a next smaller memory. If a word causes a hash collision in all N dictionary memories, then the mechanism stores the word in a final unindexed register.

When matching an input data word, the mechanisms create an N-bit hash of the input data word. For a valid input data word, the mechanism reads the status bits from the status arrays and the dictionary words from the dictionary memories from the respective hash locations. The mechanism compares each dictionary memory output with the input data word. A match occurs if the input data word matches any of the dictionary memory outputs and the corresponding status bit from the status array indicates the entry is valid.

Figure 1:
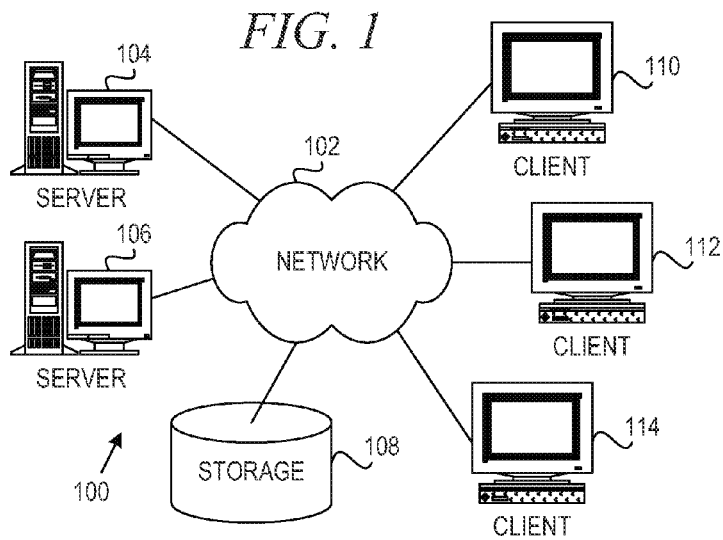
FIG. 1 depicts a pictorial representation of an example distributed data processing system in which aspects of the illustrative embodiments may be implemented.
Figure 2:
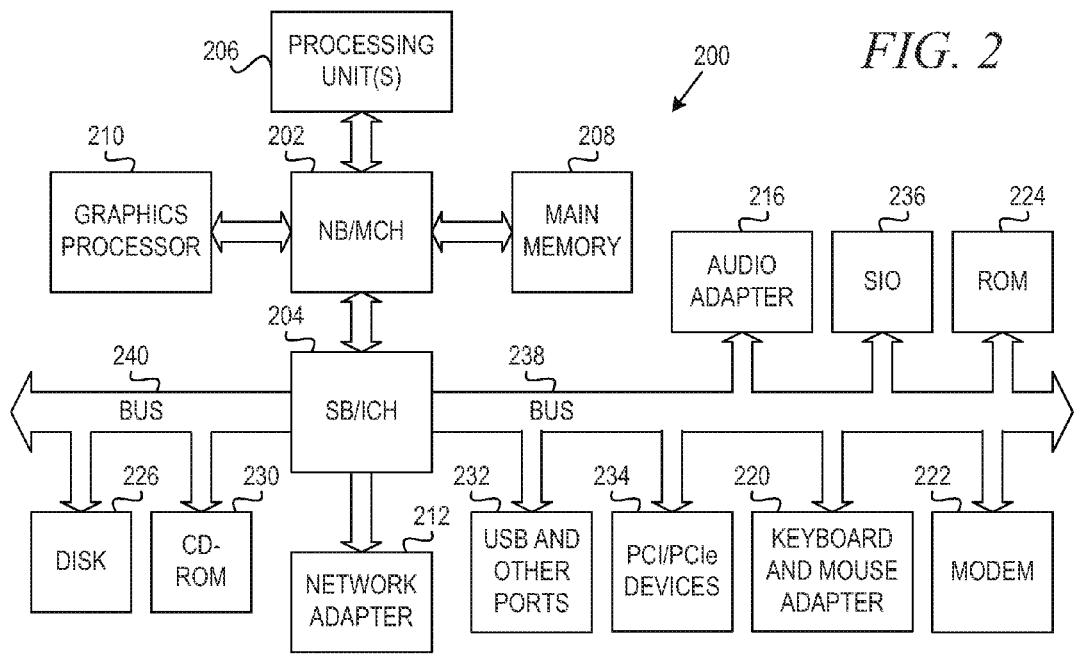
FIG. 2 is a block diagram of art example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

Server 104, for example, may perform text analytics or dictionary-based compression. Client 110, for example, may execute a virus scanning or spam filter application. Thus, servers 104, 106 and clients 110, 112, and 114 may require dictionary matching. The illustrative embodiments provide hardware architecture for high speed large scale dictionary matching.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers, PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® EServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SNIP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figures 3, 4:
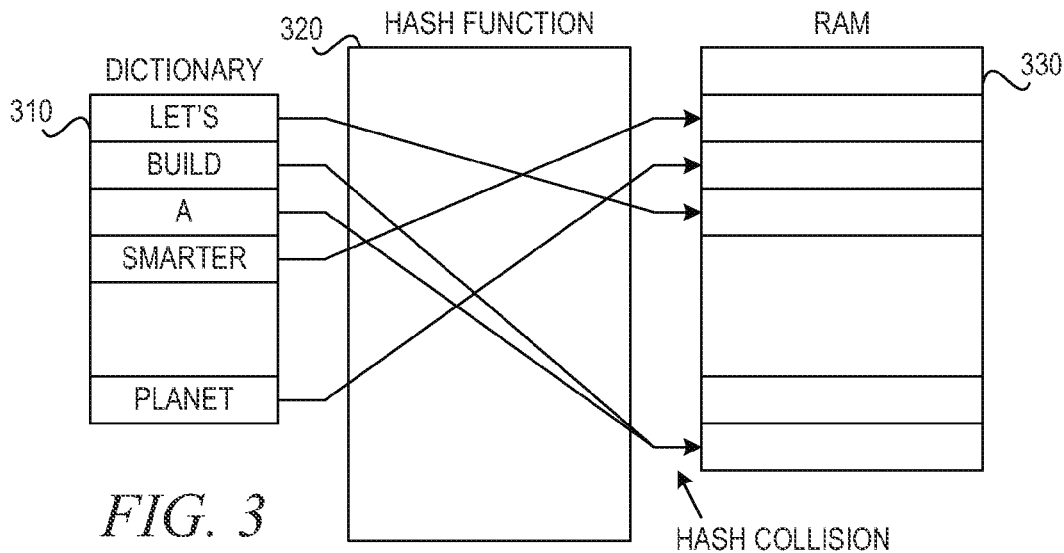
FIG. 3 illustrates a generic hashing scheme for storing dictionary entries in a memory array.
FIG. 4 is a table that illustrates expected number of collisions for given memory sizes.

FIG. 3 illustrates a generic hashing scheme for storing dictionary entries in a memory array. Consider a dictionary 310 with $2^N$ words. For a given dictionary word, a mechanism uses a hash function 320 to calculate an M-bit hash value. The mechanism then uses the hash value as an index (M-bit array address) to store a dictionary word in a particular memory, such as a random access memory (RAM) 330. For an M-bit hash, RAM 330 has $2^M$ slots to store $2^N$ words.

Because of the nature of the hash function 320, multiple dictionary words can map to the same hash value, and hence the same RAM slot, leading to a hash collision. The expected number of collisions depends on the relative sizes of the dictionary and the RAM (hash size). The expected number of hash collisions for hashing $L_D$ words in $L_M$ RAM slots, assuming perfect uniform random distribution, is as follows:

$$^{L_D}C_2 \times \left(\frac{1}{L_M}\right) \approx \left(\frac{L_D^2}{2 \times L_M}\right)$$

Hash collisions can be reduced by increasing RAM size. This approach incurs significant RAM overhead. Limited on-chip RAM limits the size of the dictionary that can be hashed in on-chip RAM. FIG. 4 is a table that illustrates expected number of collisions for given memory sizes. For a RAM size equal to the size of the dictionary, the expected rate of collisions would be 50%. For a RAM size equal to ten times the size of the dictionary, the expected rate of collisions would be 5%. Therefore, for a low rate of collisions, one must incur a large RAM overhead.

FIG. 5 is a block diagram illustrating a modified hashing scheme for high speed large scale dictionary matching in accordance with an illustrative embodiment. For dictionary 510 of size $2^N$ words, hash function 520 calculates an N-bit hash (hash[N−1:0]). The hashing scheme uses N memory arrays 531, 532, 533, 534. The first memory array, RAM 1 531, has the same size as the dictionary 510 ($2^N$ slots) and is addressed by the full hash (hash[N−1:0]). The second memory, RAM 2 532, is half the size of the dictionary 510 ($2^{N-1}$ slots) and is indexed by hash[N−2:0], and so on. RAM N 533 has two slots and is addressed by hash[0], and memory 534 is an unindexed register and has one slot.

The hashing scheme of the illustrative embodiment stores each dictionary word in the first free memory at its corresponding hash position. For example, the hashing scheme stores the first word in RAM 531 at the write address of hash[N−1:0]. If a subsequent dictionary word experiences a collision in RAM 1 531, i.e., there is already a dictionary word stored in the entry corresponding to its hash[N−1:0] index, the hashing scheme attempts to store the dictionary word in RAM 2 532 at the location given by hash [N−2:0].

FIG. 6 illustrates managing hash collisions in the modified hashing scheme of the illustrative embodiment. The hashing scheme first attempts to store each dictionary word, from a dictionary having $2^N$ words, in memory array 610, which has $2^N$ slots. The expected number of collisions of memory array 610 is $2^{N-1}$. The hash scheme attempts to store those $2^{N-1}$ dictionary words in memory array 620, which has $2^{N-1}$ slots. The expected number of collisions in memory array 620 is $2^{N-2}$. The hashing scheme of the illustrative embodiment then tries to store those $2^{N-2}$ dictionary words in the next smaller memory array, and so forth, until the hashing scheme attempts to store two words in memory 630, which has two slots. The expected number of collisions in memory array 630 is one. The modified hashing scheme then stores that one dictionary word in a memory 640 having a single slot. Memory 640 is unindexed and will have no expected collisions.

The modified hashing scheme of the illustrative embodiment has several useful properties. The probability of non-zero collisions is very small. The memory overhead is limited to twice the size of the dictionary. For a dictionary size of $L_D$, $\log(L_D)$ memory arrays are used; therefore, only a logarithmic number of memory accesses/comparisons are required for dictionary matching.

Figure 7:
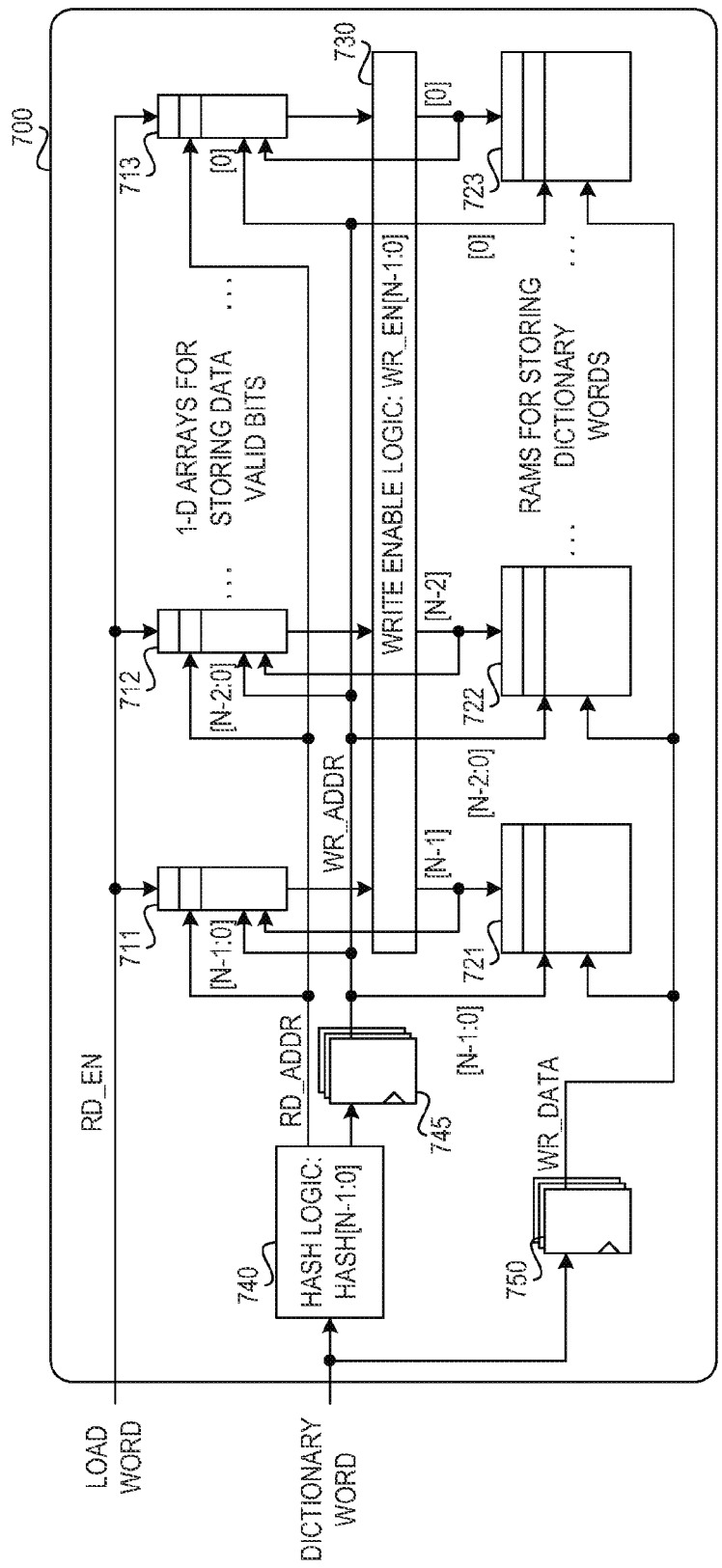
FIG. 7 is a diagram illustrating a mechanism for loading dictionaries in memory arrays in accordance with an illustrative embodiment.

FIG. 7 is a diagram illustrating a mechanism for loading dictionaries in memory arrays in accordance with an illustrative embodiment. Mechanism 700 comprises one-dimensional status arrays 711, 712, 713 corresponding to dictionary memories 721, 72, 723. For a dictionary size of $2^N$, status arrays 711, 712, 713 comprise N arrays, and dictionary memories 721, 722, 723 comprise N random access memory (RAM) arrays. Prior to loading dictionary memory arrays 721, 722, 723, status arrays 711, 712, 713 are initialized with all zero values, which indicates no slots of the dictionary memory arrays 721, 722, 723 have valid dictionary words loaded.

For a set of dictionary words that comprises $2^N$ dictionary words, the dictionary memory arrays 721, 722, 723 comprise N dictionary memory arrays, and the status arrays 711, 712, 713 comprise N status arrays. Hash logic 740 generates an N-bit hash. Each dictionary memory array, $DMA_i$, where i=0 ... N−1, stores $2^{N-i}$ entries and is addressed by N−i bits of the hash value. Each status array, $SA_i$, stores $2^{N-i}$ status bits and is addressed by N−i bits of the hash value.

When a dictionary word is loaded, hash logic 740 receives the dictionary word, which is also provided to register 750, and a LOAD WORD signal is asserted, which asserts a read enable (RD_EN) signal to status arrays 711, 712, 713. Hash logic 740 calculates a hash value for the dictionary word and provides the hash value as a read address (RD_ADDR) to status arrays 711, 712, 713. Hash logic 740 also provides the hash value as a write address (WR_ADDR), via register 745, to status arrays 711, 712, 713 and dictionary memory arrays 721, 722, 723. Status array 711 receives N bits of the hash value as a read and write address, status array 712 receives N−1 bits of the hash value as a read or write address, and so on. Dictionary memory array 721 receives N bits of the hash value as a write address, dictionary memory array 722 receives N−i bits of the hash value as a write address, and so on.

Status arrays 711, 712, 713 provided status values to write enable logic 730, which enables a write to one of dictionary memory arrays 721, 722, 723 and to a corresponding one of status arrays 711, 712, 713. Write enable logic 730 uses the status bits to generate a write enable signal to the largest dictionary memory having an open slot, indicated by a zero value of the status bit. Therefore, if the status bit read from status array 711 is zero, write enable logic asserts the write enable signal only for dictionary memory array 721 to write the dictionary word from register 750 to the dictionary memory array 721 at the appropriate write address (WR_ADDR[N−1:0]) given by the hash[N−1:0]. Write enable logic also asserts the write enable signal for the corresponding status array 7111 to write a one to the status bit at appropriate write address (WR_ADDR[N−1:0]) to indicate that slot now stores a valid dictionary word. Write enable logic 730 de-asserts the write enable signals for all other dictionary memory arrays 722, 723 and status arrays 712, 713. On the other hand, if the status bit read from status array 711 is one and the status bit read from status array 712 is zero, write enable logic asserts the write enable signal for dictionary memory array 722 to write the dictionary word from register 750 to the dictionary memory array 722 at the appropriate address (WR_ADDR[N−2:0]) given by the hash[N−2:0].

Write enable logic 730 asserts the write enable signal for dictionary memory array 723 and status array 713 only when the status bits read from all other status arrays 711, 712 have a value of one. Because status array 713 and dictionary memory array 723 receive only one bit of the read address and write address given by hash[0]. (Note that the unindexed register is not shown in the figure and 723, as drawn refers to last RAM, which is indexed by 1 bit hash.)

If the status bits read from all status arrays 711, 712, 713 have a value of one, all write enable signals are de-asserted and the dictionary word is stored in an unindexed register. The unindexed register may not be implemented. Another extension is that instead of using one unindexed register, the mechanism may have a small number (say 8) registers to handle the rare but possible scenario where more than one dictionary words collide in all RAMs and spill over to the unindexed register. In this case, the spilled over word can be stored in any one of the available register slots. While comparing the incoming data word against the dictionary, the mechanism not only compare the incoming word against N words read from the N RAMs, which are indexed based on the hash value, but the mechanism also compares an incoming word against all valid words stored in the registers. These registers are non-hash-indexed and hence all valid words in the registers are explicitly compared.

Figure 8:
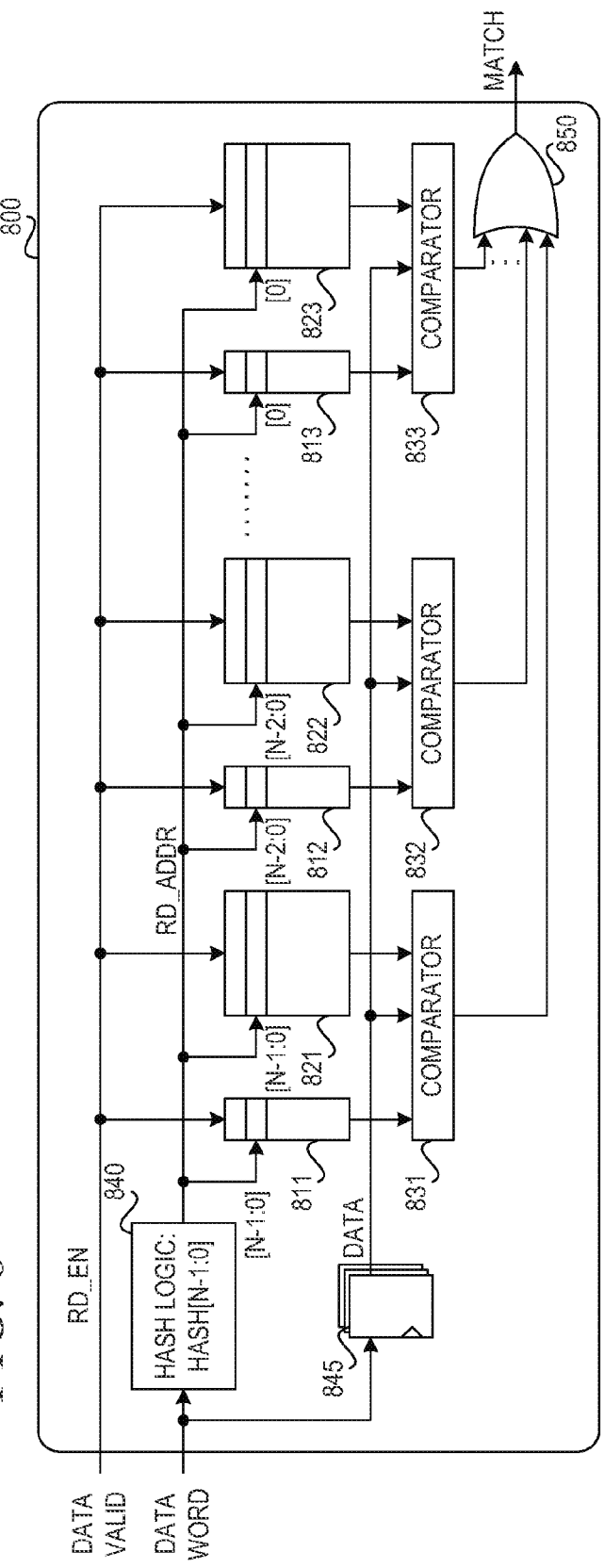
FIG. 8 is a diagram illustrating a mechanism for matching dictionary words against dictionary memory arrays in accordance with an illustrative embodiment.

FIG. 8 is a diagram illustrating a mechanism for matching dictionary words against dictionary memory arrays in accordance with an illustrative embodiment. Mechanism 800 comprises one-dimensional status arrays 811, 812, 813 corresponding to dictionary memory arrays 821, 822, 823. For a dictionary size of $2^N$, status arrays 811, 812, 813 comprise N arrays, and dictionary memories 821, 822, 823 comprise N random access memory (RAM) arrays. Mechanism 800 receives a DATA VALID signal, which is asserted unless something happened upstream of mechanism 800 resulting in an invalid data word being provided to mechanism 800. The DATA VALID signal provides a read enable (RD_EN) signal to status arrays 811, 812, 813 and dictionary memory arrays 821, 822, 823.

Hash logic 840 receives an input data word, which is also stored in register 845. H-lash logic 840 calculates a hash value for the dictionary word and provides the hash value as a read address (RD_ADDR) to status arrays 811, 812, 813 and to dictionary memory arrays 821, 822, 823. Status array 811 receives N bits of the hash value as a read address, status array 812 receives N−1 bits of the hash value as a read address, and so on. Dictionary memory array 821 receives N bits of the hash value as a read address, dictionary memory array 822 receives N−1 bits of the hash value as a read address, and so on.

Status array 811 provides a status bit to comparator 831, and dictionary memory array 821 provides a dictionary word stored at the read address (RD_ADDR[N−1:0]) given by hash[N−1:0] to comparator 831. Comparator 831 receives the status bit stored at the read address (RD_ADDR[N−1:0]) in status array 811, the dictionary word stored at the read address (RD_ADDR[N−1:0]) in dictionary memory array 821, and the input data word from register 845. Comparator 831 asserts its output if the status bit from status array 811 is asserted and the input data word matches the dictionary word read from dictionary memory array 821. Similarly, comparator 832 receives the status bit stored at the read address (RD_ADDR[N−2:0]) in status array 812, the dictionary word stored at the read address (RD_ADDR[N−2:0]) in dictionary memory array 822, and the input data word from register 845. Comparator 832 asserts its output if the status bit from status array 812 is asserted and the input data word matches the dictionary word read from dictionary memory array 822. Comparator 833 asserts its output if the status bit from status array 813 is asserted and the input data word matches the dictionary word read from dictionary memory array 823. Note the unindexed register is not shown in the FIGS. 8, and 823, as drawn, refers to the last RAM, which is indexed by 1 bit hash.

OR gate 850 receives the outputs of comparators 831, 832, 833 and asserts MATCH signal as output of mechanism 800 if any one of the comparators 831, 832, 833 finds a valid match. OR gate 850 may also receive outputs from comparators (not shown) that compare the input data word to one or more unindexed registers (not shown), as described above. That is, determining whether a dictionary memory array stores a valid dictionary word that matches the input data word comprises, for each dictionary memory array, $DMA_i$, reading $DMA_i$ using N−i bits of the hash value as a read address to generate a read word, reading $SA_i$ using N−i bits of the hash value as a read address to generate a read status, comparing the read word to the input data word, and asserting an output signal if the read word matches the input data word and the read status indicates the read word is valid. The plurality of dictionary memory arrays 821, 822, 823 generates a plurality of output signals. Mechanism 800 performs an OR operation on the plurality of output signals.

Figure 9:
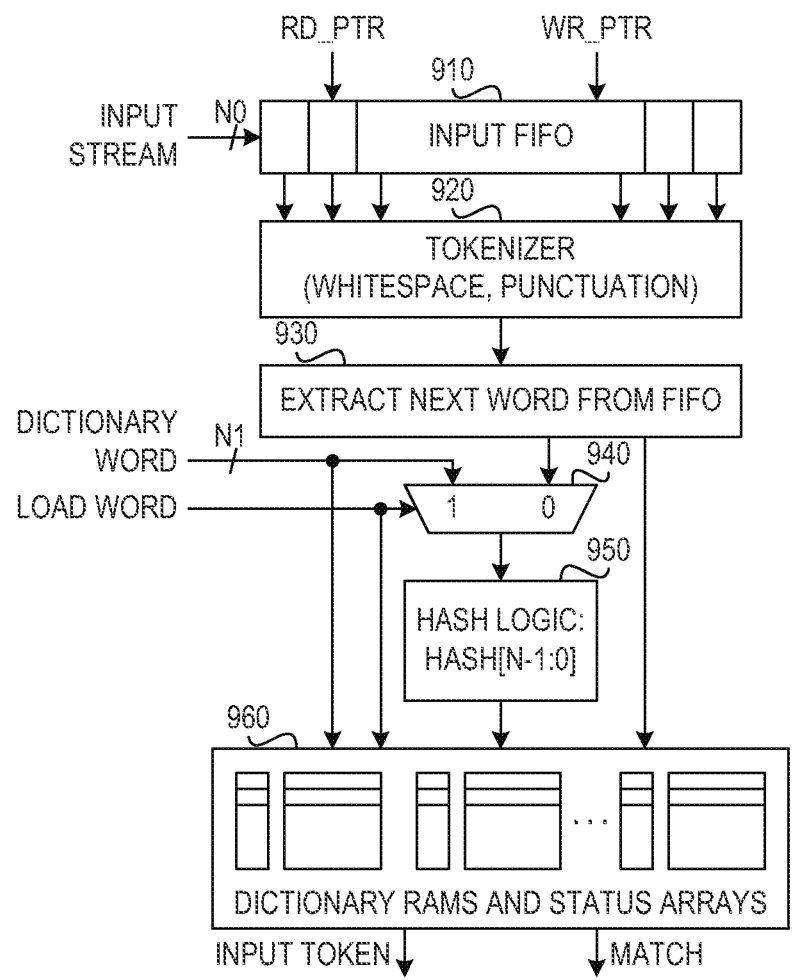
FIG. 9 is a diagram illustrating an overall mechanism for loading dictionary memory arrays and matching data words in accordance with an illustrative embodiment.

FIG. 9 is a diagram illustrating an overall mechanism for loading dictionary memory arrays and matching data words in accordance with an illustrative embodiment. Input first-in-first-out (FIFO) buffer 910 receives an input stream and maintains a read pointer (RD_PTR), and a write pointer (WR_PTR). FIFO buffer 910 provides input data to tokenizer 920, which recognizes whitespace, punctuation, and other special characters to delineate words. Component 930, using input from tokenizer 920, extracts a next word from FIFO buffer 910 and provides the data word to multiplexer 940. The mechanism of FIG. 9 processes one word (token) every cycle from the input stream.

Multiplexer 940 receives an input dictionary word to be loaded into dictionary memory arrays and status arrays component 960, in addition to a next word from component 930. Multiplexer 940 selects between input dictionary words and words from the input stream based on a load word signal. If the load word signal is asserted, multiplexer 940 provides the input dictionary word to hash logic 950. If the load word signal is de-asserted, multiplexer 940 provides the next word from the input stream to hash logic 950.

Dictionary memory arrays and status arrays component 960 receives the load word signal, the input dictionary word, the hash from hash logic 950, and the next input data word from component 930. If the load word signal is asserted, component 960 loads the input dictionary word into the dictionary memory arrays and updates the status arrays. If the load word signal is de-asserted, component 960 matches the input data word against the dictionary memory arrays and outputs the input data word (INPUT TOKEN) and whether a match is detected (MATCH).

The scheme can be implemented in hardware as a hardware accelerator for high speed dictionary matching. For an average word length of five to six characters and a clock frequency of 250 MHz, the mechanism of FIG. 9 achieves a processing bandwidth of 10-12 Gbps. The mechanism of FIG. 9 can be used to count total matches per dictionary, to count individual counts for each word, and to filter matching or non-matching words from an input stream.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 10:
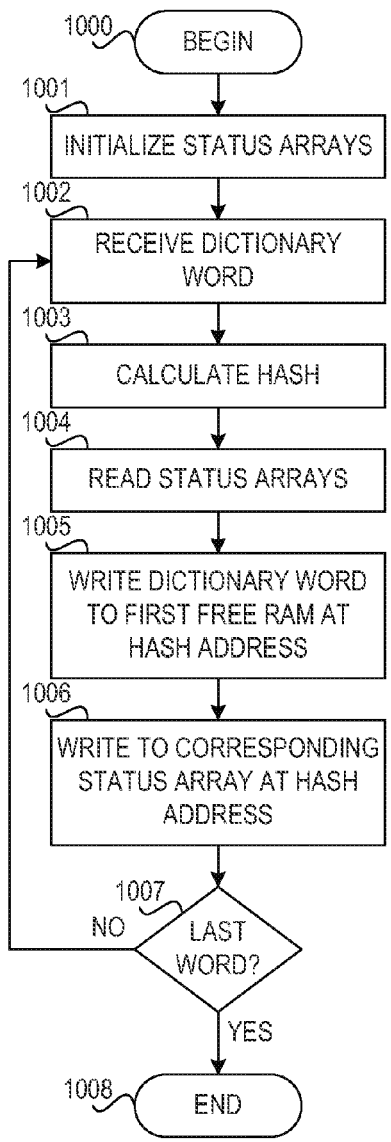
FIG. 10 is a flowchart illustrating operation of a mechanism for loading dictionary words into memory arrays in accordance with an illustrative embodiment.

FIG. 10 is a flowchart illustrating operation of a mechanism for loading dictionary words into memory arrays in accordance with an illustrative embodiment. Operation begins in block 1000, and the mechanism initializes the status arrays (block 1001), such as status arrays 711, 712, 713 in FIG. 7, to indicate the dictionary memory arrays are empty, i.e., contain no valid dictionary entries. The mechanism receives a dictionary word (block 1002) and calculates a hash value for the dictionary word (block 1003), such that the hash value serves as a read and/or write address to the status arrays and dictionary memory arrays, such as memory arrays 721, 722, 723 in FIG. 7. The mechanism then reads the status arrays (block 1004) and writes the dictionary word to a first free dictionary memory array at the appropriate address derived from the hash value (block 1005). The mechanism also writes to the corresponding write array at the hash address to indicate the entry contains a valid dictionary word (block 1006).

The mechanism then determines whether the dictionary word is the last word to be loaded (block 1007). If the dictionary word is not the last word to be loaded, operation returns to block 1002 to receive the next dictionary word. If the dictionary word is the last word to be loaded in block 7007, operation ends in block 1008.

Figure 11:
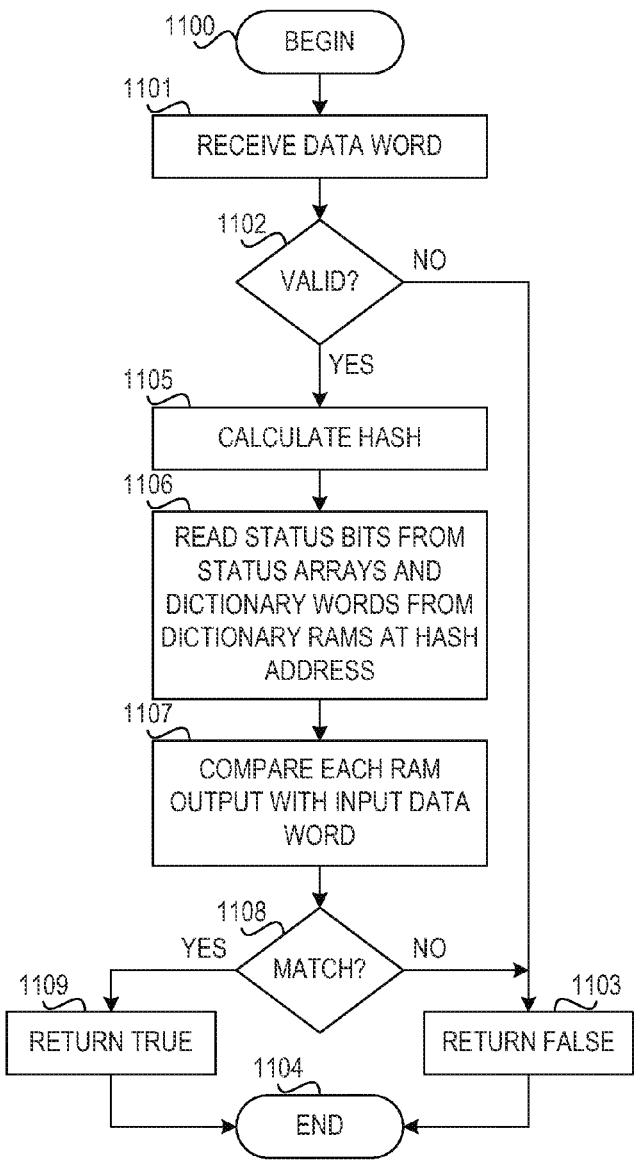
FIG. 11 is a flowchart illustrating operation of a mechanism for matching data words against dictionary memory arrays in accordance with an illustrative embodiment.

FIG. 11 is a flowchart illustrating operation of a mechanism for matching data words against dictionary memory arrays in accordance with an illustrative embodiment. Operation begins in block 1100, and the mechanism receives a data word to be matched against the dictionary (block 1101). The mechanism determines whether the input data word is valid (block 1102). The mechanism may determine the input data word is invalid if something happened upstream resulting in the data word being invalid, for example. If the mechanism determines the input data word is not valid, the mechanism returns a false result indicating no match (block 1103), and operation ends in block 1104.

If the mechanism determines the input data word is valid in block 1102, the mechanism calculates a hash value from the data word (block 1105). The mechanism reads status bits from the status arrays and dictionary words from the dictionary memory arrays at the hash address (block 1106). The mechanism then compares each dictionary memory array output with the input data word (block 1107) and determines whether a match is detected (block 1108). The mechanism determines a match is detected if one dictionary memory array outputs a dictionary word matching the data word and the corresponding status array outputs a status bit indicting the dictionary word is valid. If no dictionary memory array outputs a valid dictionary word that matches the data word or more than one dictionary memory array outputs a valid dictionary word that matches the data word, then the mechanism does not detect a match. If the mechanism detects a match in block 1108, the mechanism returns a true value indicating a match (block 1109), and operation ends in block 1104. If the mechanism does not detect a match in block 1108, the mechanism returns a false value indicating no match (block 1103), and operation ends in block 1104.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved, it will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for high speed large scale dictionary matching. The mechanisms provide a plurality of dictionary memory arrays. A first dictionary memory array is the same size as the dictionary to be stored. A second dictionary memory array is half the size as the first dictionary memory array, a third dictionary memory array is half the size as the second, and so on. The second dictionary memory array attempts to store dictionary words that collide with a previously stored dictionary word in the first dictionary memory array, the third dictionary memory array attempts to store dictionary words that collide with a previously stored dictionary word in the second dictionary memory array, and so on. The mechanisms provide one-dimensional status arrays, each corresponding to a respective one of the dictionary memory arrays. The status arrays store valid/invalid status bits to indicate which entries in the corresponding dictionary memory arrays store valid dictionary words. The mechanisms provide hashing logic that generates a hash value that is used to address the status arrays and dictionary memory arrays.

The mechanisms provide matching logic to receive input data words and determine whether the input data words match dictionary words in the dictionary memory arrays. The mechanisms generate a hash value based on an input data word. The mechanisms use the hash value to address the status arrays and dictionary memory arrays. The mechanisms detect a match if only one dictionary memory array outputs a valid dictionary word that matches the input data word.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for dictionary matching, the method comprising:
   loading a plurality of dictionary memory arrays with a set of dictionary words and updating a plurality of status arrays, wherein each status array of the plurality of status arrays corresponds to a respective one of the plurality of dictionary memory arrays and wherein each entry of a given status array stores a status bit that indicates whether a corresponding entry of the corresponding dictionary memory array stores a valid dictionary word;
   receiving an input data word;
   generating a hash value based on the input data word;
   reading a dictionary word from each of the dictionary memory arrays and a status bit from each of the status arrays using the hash value as a read address; and
   determining whether a dictionary memory array within the plurality of dictionary memory arrays stores a valid dictionary word that matches the input data word.

2. The method of claim 1, wherein the set of dictionary words comprises $2^N$ dictionary words, wherein the plurality of dictionary memory arrays comprises N dictionary memory arrays, and wherein the plurality of status arrays comprises N status arrays.

3. The method of claim 2, wherein generating a hash value based on the input data word comprises generating an N-bit hash.

4. The method of claim 3, wherein each dictionary memory array, $DMA_i$, where i=0 ... N−1, stores $2^{N-i}$ entries and is addressed by N−i bits of the hash value; and
   wherein each status array, $SA_i$, stores $2^{N-i}$ status bits and is addressed by N−i bits of the hash value.

5. The method of claim 4, wherein determining whether a dictionary memory array within the plurality of dictionary memory arrays stores a valid dictionary word that matches the input data word comprises:
   for each dictionary memory array, $DMA_i$, reading DMA using N−i bits of the hash value as a read address to generate a read word, reading $SA_i$ using N−i bits of the hash value as a read address to generate a read status, comparing the read word to the input data word, and asserting an output signal if the read word matches the input data word and the read status indicates the read word is valid,
   wherein the plurality of dictionary memory arrays generate a plurality of output signals.

6. The method of claim 5, wherein determining whether a dictionary memory array within the plurality of dictionary memory arrays stores a valid dictionary word that matches the input data word further comprises:
   performing an OR operation on the plurality of output signals.

7. The method of claim 1, wherein loading the plurality of dictionary memory arrays with the set of dictionary words and updating the plurality of status arrays comprises:
   for a given input dictionary word, generating a corresponding hash value based on the input dictionary word, reading each status array at a target address based on the corresponding hash value to generate a read status, asserting a write enable signal to a target dictionary memory array having a largest size and a read status indicating that a valid dictionary word is not stored in the target dictionary memory array at the target address, and writing the given input dictionary word to the target dictionary memory array at the target address.

8. The method of claim 7, wherein loading the plurality of dictionary memory arrays with the set of dictionary words and updating the plurality of status arrays further comprises:
   writing a valid bit to a target status array corresponding to the target dictionary memory array.

9. The method of claim 7, wherein loading the plurality of dictionary memory arrays with the set of dictionary words and updating the plurality of status arrays further comprises:
   responsive to all hash-indexed dictionary memory arrays having a read status indicating that a valid dictionary word is stored in the target dictionary memory array at the target address, writing the given input dictionary word to a non-hash-indexed register.

10. The method of claim 1, wherein the plurality of dictionary memory arrays comprise at least one non-hash-indexed register.

11. An apparatus for dictionary matching, the apparatus comprising:
    a plurality of dictionary memory arrays loaded with a set of dictionary words;
    a plurality of status arrays, wherein each status array of the plurality of status arrays corresponds to a respective one of the plurality of dictionary memory arrays and wherein each entry of a given status array stores a status bit that indicates whether a corresponding entry of the corresponding dictionary memory array stores a valid dictionary word;
    hash logic configured to receive an input data word and generate a hash value based on the input data word; and
    a plurality of comparators, wherein each comparator within the plurality of comparators is configured to receive a dictionary word from a respective one of the plurality of dictionary memory arrays and a status bit from a respective one of the plurality of status arrays using the hash value as a read address and to determine whether the dictionary memory array stores a valid dictionary word that matches the input data word.

12. The apparatus of claim 11, wherein the set of dictionary words comprises $2^N$ dictionary words, wherein the plurality of dictionary memory arrays comprises N dictionary memory arrays, and wherein the plurality of status arrays comprises N status arrays.

13. The apparatus of claim 12, wherein the hash logic generates an N-bit hash.

14. The apparatus of claim 13, wherein each dictionary memory array, $DMA_i$, where i=0 ... N−1, stores $2^{N-i}$ entries and is addressed by N−i bits of the hash value; and
    wherein each status array, $SA_i$, stores $2^{N-i}$ status bits and is addressed by N−i bits of the hash value.

15. The apparatus of claim 14, wherein the apparatus determines whether a dictionary memory array within the plurality of dictionary memory arrays stores a valid dictionary word that matches the input data word, comprising:
    for each dictionary memory array, $DMA_i$, reading DMA, using N−i bits of the hash value as a read address to generate a read word, reading $SA_i$ using N−i bits of the hash value as a read address to generate a read status, comparing the read word to the input data word, and asserting an output signal if the read word matches the input data word and the read status indicates the read word is valid,
    wherein the plurality of dictionary memory arrays generate a plurality of output signals.

16. The apparatus of claim 15, wherein determining whether a dictionary memory array within the plurality of dictionary memory arrays stores a valid dictionary word that matches the input data word further comprises:

performing an OR operation on the plurality of output signals.

17. The apparatus of claim 11, wherein the apparatus loads the plurality of dictionary memory arrays with the set of dictionary words and updating the plurality of status arrays, comprising:

for a given input dictionary word, generating a corresponding hash value based on the input dictionary word, reading each status array at a target address based on the corresponding hash value to generate a read status, asserting a write enable signal to a target dictionary memory array having a largest size and a read status indicating that a valid dictionary word is not stored in the target dictionary memory array at the target address, and writing the given input dictionary word to the target dictionary memory array at the target address.

18. The apparatus of claim 17, wherein loading the plurality of dictionary memory arrays with the set of dictionary words and updating the plurality of status arrays further comprises:

writing a valid bit to a target status array corresponding to the target dictionary memory array.

19. The apparatus of claim 17, wherein loading the plurality of dictionary memory arrays with the set of dictionary words and updating the plurality of status arrays further comprises:

responsive to all hash-indexed dictionary memory arrays having a read status indicating that a valid dictionary word is stored in the target dictionary memory array at the target address, writing the given input dictionary word to a non-hash-indexed register.

20. The apparatus of claim 11, wherein the plurality of dictionary memory arrays comprise at least one non-hash-indexed register.

21. A dictionary matching apparatus comprising:

an input buffer, wherein the input buffer is configured to receive a stream of input words;

a tokenizer, wherein the tokenizer is configured to identify whitespace and punctuation characters in the stream of input words in the input buffer to generate a tokenized stream of input words;

extraction logic, wherein the extraction logic is configured to extract a next input data word from the tokenized stream of input words;

hash logic, wherein the hash logic is configured to generate a hash value based on the next input data word; and a plurality of dictionary memory arrays loaded with a set of dictionary words and a plurality of status arrays, wherein each status array of the plurality of status arrays corresponds to a respective one of the plurality of dictionary memory arrays and wherein each entry of a given status array stores a status bit that indicates whether a corresponding entry of the corresponding dictionary memory array stores a valid dictionary word, wherein the plurality of dictionary memory arrays and the plurality of status arrays generate a match signal indicating whether a dictionary memory array within the plurality of dictionary memory arrays stores a valid dictionary word that matches the input data word.

22. The dictionary matching apparatus of claim 21, further comprising:

a multiplexer, wherein the multiplexer is configured to select between the next input data word and a dictionary word to be loaded into the plurality of dictionary memory arrays based on a load word signal, wherein the hash logic is further configured to generate a corresponding hash value based on the dictionary word and wherein the plurality of dictionary memory arrays are configured to write the dictionary word to a target dictionary memory array within the plurality of dictionary memory arrays at a target address based on the corresponding hash value.

* * * * *